(12) United States Patent
Nakazono et al.

(10) Patent No.: US 11,263,042 B2
(45) Date of Patent: Mar. 1, 2022

(54) CONTROL PROCESSING DEVICE, CONTROL PROCESSING METHOD, AND CONTROL PROCESSING PROGRAM

(71) Applicant: NIPPON TELEGRAPH AND TELEPHONE CORPORATION, Tokyo (JP)

(72) Inventors: Sho Nakazono, Musashino (JP); Hiroki Kumazaki, Musashino (JP); Hiroyuki Uchiyama, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 3 days.

(21) Appl. No.: 17/046,312

(22) PCT Filed: Apr. 12, 2019

(86) PCT No.: PCT/JP2019/016027
§ 371 (c)(1),
(2) Date: Oct. 9, 2020

(87) PCT Pub. No.: WO2019/198824
PCT Pub. Date: Oct. 17, 2019

(65) Prior Publication Data
US 2021/0117226 A1 Apr. 22, 2021

(30) Foreign Application Priority Data
Apr. 12, 2018 (JP) .............................. JP2018-077149

(51) Int. Cl.
*G06F 9/46* (2006.01)
*G06F 9/52* (2006.01)

(52) U.S. Cl.
CPC .............. *G06F 9/467* (2013.01); *G06F 9/526* (2013.01)

(58) Field of Classification Search
None
See application file for complete search history.

(56) References Cited

U.S. PATENT DOCUMENTS

2018/0349037 A1* 12/2018 Zhao ...................... G06F 3/0611
2019/0324673 A1* 10/2019 Graefe ................ G06F 16/2343

OTHER PUBLICATIONS

Gerhard Weikum and GottfriedVossen, "Transactional Information Systems: Theory, Algorithms, and the Practice of Concurrency Control and Recovery", May 30, 2001, 3 pp.

(Continued)

*Primary Examiner* — Scott C Sun
(74) *Attorney, Agent, or Firm* — Xsensus LLP (57) ABSTRACT

A control processing device includes a determining unit that determines whether a write of a transaction is to be executed using a write lock or without using the write lock upon receiving a write command of the transaction, a writing unit that acquires the write lock for the transaction and executes the write of the transaction when the determining unit has determined that the write of the transaction is to be executed using the write lock, an optimizing unit that discards the write command of the transaction when the determining unit has determined that the write of the transaction is to be executed without using the write lock, and a return unit that returns to a command source that the write of the transaction has succeeded after the write by the writing unit or after the discarding of the write command by the optimizing unit.

6 Claims, 8 Drawing Sheets

(56) References Cited

OTHER PUBLICATIONS

Robert Thomas, "A Majority Consensus Approach to Concurrency Control for Multiple Copy Databases", ACM Transactions on Database Systems, vol. 4, No. 2, Jun. 1979, 30 pp.
Xiangyao Yu, et al., "Staring into the Abyss: An Evaluation of Concurrency Control with One Thousand Cores", Proceedings of the VLDB Endowment, vol. 8, No. 3, 2014, 12 pp.

* cited by examiner

| Algorithm 1 ALGORITHM OF PRESENT EMBODIMENT |
|---|
| input READ TARGET TUPLE SET RS, WRITE TARGET TUPLE SET WS <br> output WHETHER OR NOT OPTIMIZATION IS POSSIBLE <br>     function can_be_invisible <br>       for *tuple in WS* do <br>         cas_succeed ← false <br>         while(cas_succeed == false) <br>           filter ← tuple.bloomfilter <br> (a)         for read_tuple in RS do <br>             if filter.may_contain(read_tuple) <br>               return false <br>             end if <br>         end for <br>         new_filter ← filter.merge(WS) <br> (b)         if(tuple.bloomfilter.CAS(filter, new_filter)) <br>           cas_succeed ← true <br>         end if <br>       end while <br>     end for <br>     return true |

---
Algorithm 2 ENTIRE TRANSACTION PROCESSING DEVICE
---
interface BEGIN *begin*, READ *read*, WRITE *write*, END *commit*
input DATA STRUCTURE *Index*, LOG MANAGEMENT MECHANISM *Log*.
output either COMMIT C or ABORT A
    function begin
      WS, RS ←[]

function read(key)
      tuple ← Index.get(key)
      RS.add(key, tuple)
      return tuple.value     function write(key, value)
      tuple ← Index.get(key)
      WS.add(key, value, tuple)

function commit
(A)    if can_be_invisible(RS, WS) // Proposal
(B)      if anti_dependency_validation(RS)
        return *abort*;
      return *commit*
    else // Conventional
      for key, value, tuple in WS
        tuple.lock()
      end for
(B)      if anti_dependency_validation(RS)
        return *abort*;

(C)      for key, value, tuple in WS
        Log.write(key, value)
        tuple.update(value)
        if key is not in RS // BlindWrite
          tuple.bloomfilter.XCHG(WS)
        endif    end if
        tuple.unlock()
      end for
    end if
    return *commit*

CONTROL PROCESSING DEVICE, CONTROL PROCESSING METHOD, AND CONTROL PROCESSING PROGRAM

CROSS-REFERENCE TO RELATED APPLICATIONS

The present application is based on PCT filing PCT/JP2019/016027, filed Apr. 12, 2019, which claims priority to JP 2018-077149, filed Apr. 12, 2018, the entire contents of each are incorporated herein by reference.

TECHNICAL FIELD

The present invention relates to a control processing device, a control processing method, and a control processing program.

BACKGROUND ART

A sequential group of inseparable data processes performed by a computer is called a transaction. Processing of transactions requires atomicity, consistency, isolation, and durability (ACID).

Execution of transactions in parallel in a multi-core environment in the processing of transactions generates processing results equivalent to those when they are serially executed with a single core. This property is isolation and an algorithm for realizing the isolation is called a concurrency control algorithm.

The equivalence used here is classified into several types. Using different equivalences changes a combination of permitted processing results. A concurrency control algorithm that uses multiversion serializability (MVSR) (for example, see NPL 1) for equivalence among such types of equivalence provides the greatest number of processing results that can be regarded as being equivalent to that of serial execution.

Here, the algorithm that uses MVSR for equivalence is realized only with multiversion concurrency control that requires great computational complexity, such that performance that can withstand practical use is not obtained.

Therefore, a single-version (1 Version) concurrency control algorithm with little computational complexity has been proposed, which uses conflict serializability (CSR) permitting a smaller number of processing results than MVSR for verification of equivalence.

CITATION LIST

Non Patent Literature

[NPL 1] Gerhard Weikum and Gottfried Vossen, 2001. Transactional Information Systems: Theory, Algorithms, and the Practice of Concurrency Control and Recovery, Morgan Kaufmann Publishers Inc., San Francisco, Calif., USA.
[NPL 2] Robert H. Thomas (1979), "A majority consensus approach to concurrency control for multiple copy databases," ACM Transactions on Database Systems, 4 (2): 180-209, doi:10.1145/320071.320076
[NPL 3] Xiangyao Yu, George Bezerra, Andrew Pavlo, Srinivas Devadas, and Michael Stonebraker, 2014, "Staring into the abyss: an evaluation of concurrency control with one thousand cores," Proc. VLDB Endow. 8, 3 (November 2014), 209-220.

SUMMARY OF THE INVENTION

Technical Problem

Here, the single-version concurrency control algorithm that uses CSR for equivalence requires that all write processes be reflected. On the other hand, this is not the case for those which use MVSR for equivalence (see NPL 2), where some write processes can be discarded. Such discarding of some write processes cannot be performed with CSR. Thus, it has been reported that all existing transaction processing devices and concurrency control algorithms exhibit significant performance reduction when writes conflict (see NPL 3).

With the foregoing in view, it is an object of the present invention to provide a control processing device, a control processing method, and a control processing program which eliminate this performance reduction when writes conflict without impairing the high implementation efficiency and processing performance of the single-version concurrency control algorithm.

Means for Solving the Problem

The control processing device of the present invention to solve the problems described above and achieve the object is a control processing device that controls write processes of transactions, the control processing device including a determining unit configured to determine whether a write of a transaction is to be executed using a write lock or without using the write lock upon receiving a write command of the transaction, a writing unit configured to acquire the write lock for the transaction and execute the write of the transaction when the determining unit has determined that the write of the transaction is to be executed using the write lock, an optimizing unit configured to discard the write command of the transaction when the determining unit has determined that the write of the transaction is to be executed without using the write lock, and a return unit configured to return to a command source that the write of the transaction has succeeded after the write by the writing unit or after the discarding of the write command by the optimizing unit.

Effects of the Invention

According to the present invention, it is possible to eliminate the performance reduction when writes conflict without impairing the high implementation efficiency and processing performance of the single-version concurrency control algorithm.

DESCRIPTION OF EMBODIMENTS

Hereinafter, embodiments of a control processing device, a control processing method, and a control processing program according to the present application will be described in detail with reference to the drawings. The present invention is not limited by the embodiments described below.

[Definitions of Main Symbols]

Main symbols used in the embodiments are shown in a table below. The same symbols will be used in the following description.

TABLE 1

| Symbol | Definition |
|---|---|
| $T_i$ | Single transaction |
| $r_i(x)$ | Read command for x included in transaction i |
| $w_i(x)$ | Write command for x included in transaction i |
| $c_i$ | Normal end of $T_i$. Indicates that all commands have been reflected. |
| $a_i$ | Abnormal end of $T_i$. Indicates that not all commands have been reflected. |
| S | Command set of all transactions |
| H | Command execution order that concurrency control algorithm generates from S |
| N | Number of all transactions |
| M | Specific order in which N are serially executed. $M \in N!$ |

[Mathematical Background in Related Art]

First, background knowledge required in the following description will be described. A transaction (T) refers to a sequence of inseparable sequential commands. The number i of commands included in the command sequence is such that 0<i. Commands that constitute transaction processes are read (r) and write (w). The algorithm gives either commit (c) or abort (a) to a command sequence as a terminal symbol.

The purpose of the concurrency control algorithm is to quickly generate a processing result equivalent to a processing result of serial execution. For example, N! serial execution orders exist for N transactions and thus it is only necessary to obtain command execution orders H equivalent to one of the serial execution orders M_ (e.g., $T_i \rightarrow T_j \rightarrow T_k \ldots$).

When transactions are executed in parallel in a multi-core environment, a command set shown in expression (1) exists for commands op (op $\in$ r, w) included in processes of the transactions.

[Formula 1]

$$S = \sum_{i=1}^{N} op(T_i) \quad (1)$$

Here, |S|! execution orders exist for S. The concurrency control algorithm limits the |S|! execution orders using a synchronization mechanism such as locks to generate command execution orders H equivalent to the serial execution orders.

There are some classifications for equivalence. Depending on the equivalence used, H may be rejected because it cannot be regarded as equivalent to any serial execution order. Therefore, it is desirable to use an equivalence which allows a greater number of command execution orders H among |S|! execution orders to be regarded as being equivalent to the serial execution orders.

Most of the existing techniques use CSR for equivalence. This CSR can be easily implemented by performing locking, that is, exclusive control, for both write and read processes. Therefore, many algorithms for single-version concurrency control that uses CSR for equivalence have been proposed.

When CSR is used for equivalence, write processes of all transactions always need to be serialized using locks or the like. This constraint guarantees the following (expression (2)) for a command execution order H generated by the concurrency control algorithm of CSR.

[Formula 2]

$$\exists w_i, op_j \in \{r_j, w_j\} \wedge i <_M j \rightarrow w_i <_H op_j \text{ (there exists } w_i, op_j \text{ and } i <_M j \text{ such that } w_i <_H op_j) \quad (2)$$

The order of writes ($w_i \rightarrow w_j$) and the order of a read with respect to a write ($w_i \rightarrow r_j$) in the serial execution order M and the command execution order H generated by the concurrency control algorithm should always match when CSR is used for equivalence.

In order to satisfy this constraint, the concurrency control algorithm acquires locks for write processes and determines the order thereof with respect to other transactions. In other words, in CSR, the order in which write locks are acquired determines the order of transactions in M. Acquiring locks for writes means to determine M from a set of N! orders and thus it is not possible to determine their order in H without acquiring locks. Due to this constraint, the single-version concurrency control algorithm that uses CSR for equivalence should always acquire locks even if writes conflict for a specific tuple, such that the multi-core environment cannot be used effectively and performance is inevitably reduced.

Embodiments

Thus, a control processing device according to the present embodiment performs optimization that determines a serial execution order M without using a write lock with a single-version concurrency control algorithm as a baseline. Specifically, in the control processing device according to the present embodiment, a Bloom Filter that can be operated atomically is added to a single-version concurrency control algorithm that uses CSR for equivalence to extend it to an algorithm that uses MVSR for equivalence. As a result, in the control processing device according to the present embodiment, it is possible to discard some writes even if write conflicts occur and thus to speed up the processing.

Figure 1:
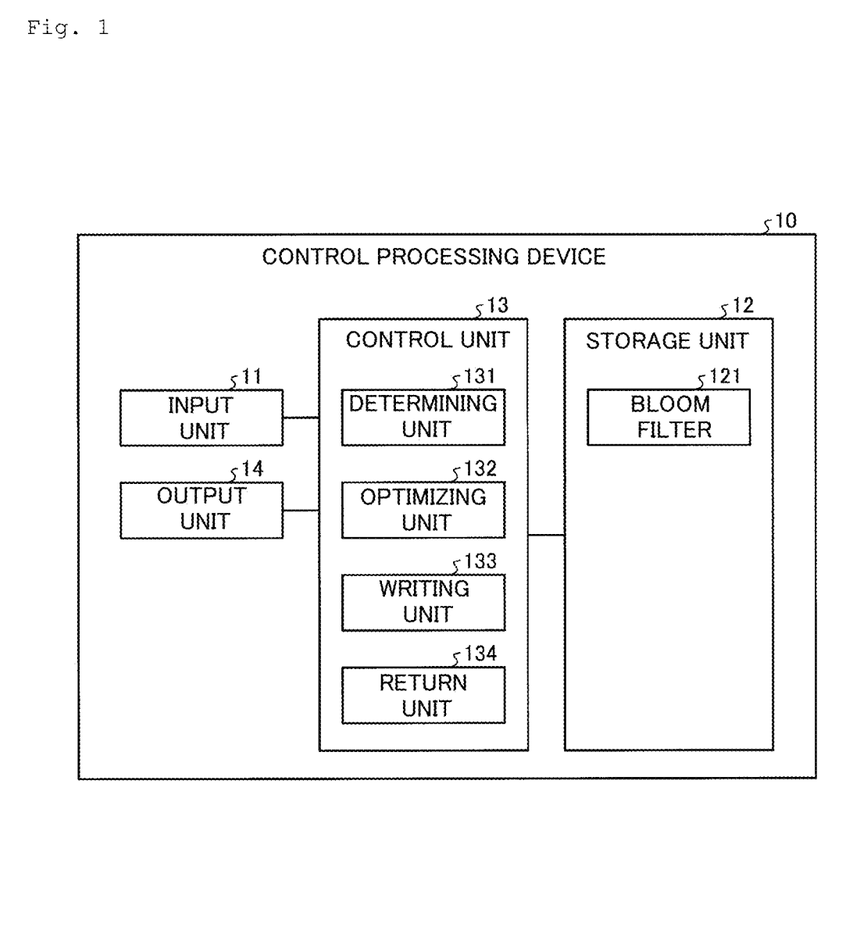
FIG. 1 is a block diagram showing an example of a configuration of a control processing device according to an embodiment.

FIG. 1 is a block diagram showing an example of a configuration of a control processing device according to an embodiment. As shown in FIG. 1, the control processing device 10 according to the present embodiment is a control processing device that controls write processes of transactions and includes an input unit 11, a storage unit 12, a control unit 13, and an output unit 14.

The input unit 11 is an input interface that receives various operations from an operator of the control processing device 10. For example, the input unit 11 is made of an input device such as a keyboard or a mouse.

The storage unit 12 is realized by a semiconductor memory device such as a random access memory (RAM) or a flash memory or a storage device such as a hard disk or an optical disc, and stores a processing program causing the control processing device 10 to operate, data used during execution of the processing program, and the like. The storage unit 12 has a Bloom filter 121.

The Bloom filter 121 is a log in which information regarding writes of transactions is recorded and recording thereof is performed atomically. Write commands of all transactions of the control processing device 10 are recorded on the Bloom filter 121. The Bloom filter 121 is a term referring to a data structure in computer science which can determine whether or not data is present at a very high speed compared to other data structures. For example, the Bloom filter 121 is a data structure in which identification information of transactions and write commands in the transactions are represented in association with write times by bit strings.

The control unit 13 controls the entirety of the control processing device 10. The control unit 13 is, for example, an electronic circuit such as a central processing unit (CPU) or a micro processing unit (MPU) or an integrated circuit such as an application specific integrated circuit (ASIC) or a field programmable gate array (FPGA). The control unit 13 has an internal memory for storing programs defining various processing procedures and control data and executes each process using the internal memory. The control unit 13 also functions as various processing units through running of various programs. The control unit 13 includes a determining unit 131, an optimizing unit 132, a writing unit 133, and a return unit 134.

Upon receiving a write command of a transaction, the determining unit 131 determines whether the write of the transaction is to be executed using a write lock or without using a write lock. The determining unit 131 refers to the Bloom filter 121 and takes a write command which does not involve a process of reading its content already recorded in the Bloom filter 121 as a target write command for determination. If isolation of the target write command for determination cannot be guaranteed, the determining unit 131 causes the writing unit 133 to acquire a write lock and execute the write of the transaction. The determining unit 131 refers to the Bloom filter 121 and verifies the isolation of the target write process for determination according to the presence or absence of a dependency relation between a plurality of write commands.

The optimizing unit 132 discards the write command of the transaction when the determining unit 131 has determined that the write of the transaction is to be executed without using a write lock. The optimizing unit 132 discards the write in accordance with an atomic command and records in the Bloom filter 121 that the write command has been discarded exclusively with respect to other transactions. The optimizing unit 132 implements, for example, a CAS command.

The writing unit 133 is a concurrency control unit that performs single-version control. The writing unit 133 applies a concurrency control algorithm that uses CSR for equivalence to execute a write of a transaction. When the determining unit 131 has determined that the write of the transaction is to be executed using a write lock, the writing unit 133 acquires a write lock for the transaction and executes the write of the transaction.

The return unit 134 returns to a command source that the write of the transaction has succeeded after the write by the writing unit 133 or after the discarding of the write command by the optimizing unit 132.

The output unit 14 is, for example, a liquid crystal display or a printer and outputs various information. The output unit 14 may be an interface responsible for receiving and outputting various data from and to an external device and may output various information to the external device.

[Processing Flow]

Figure 2:
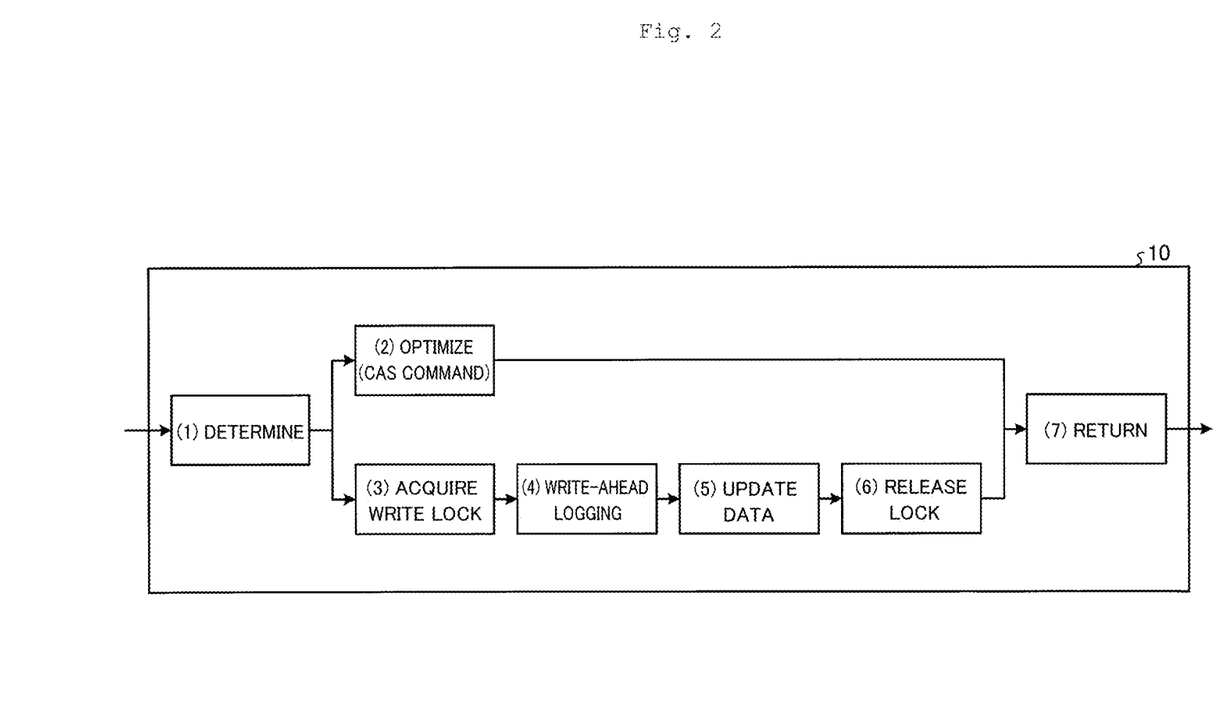
FIG. 2 is a diagram illustrating a flow of processing of the control processing device shown in FIG. 1.

Next, a flow of processing of the control processing device 10 will be described. FIG. 2 is a diagram illustrating a flow of processing of the control processing device 10 shown in FIG. 1.

When the control processing device 10 has received a write command of a transaction, the determining unit 131 determines whether the write of the transaction is to be executed using a write lock or without using a write lock as shown in FIG. 2 (see (1) in FIG. 2).

When the determining unit 131 has determined that the write of the transaction is to be executed without using a write lock, the optimizing unit 132 performs an optimization process of executing a CAS command and discarding the write command of the transaction (see (2) in FIG. 2).

When the determining unit 131 has determined that the write of the transaction is to be executed using a write lock, the writing unit 133 acquires a write lock for the transaction and executes the write of the transaction. Specifically, the writing unit 133 executes a series of processes of acquiring a write lock (see (3) in FIG. 2), performing write-ahead logging (WAL) (see (4) in FIG. 2), updating data (see (5) in FIG. 2), and releasing the lock (see (6) in FIG. 2).

After the write by the writing unit 133 or the discarding of the write command by the optimizing unit 132, the return unit 134 returns to the command source that the write of the transaction has succeeded (see (7) in FIG. 2) and ends the processing.

[Mathematical Background of Present Embodiment]

Next, a mathematical background of the present embodiment will be described. The control processing device 10 performs optimization that determines the order of transactions without using a write lock with the single-version concurrency control algorithm as a baseline. That is, it is possible to discard $w_j$ if, when the order of write processes $w_i$ and $w_j$ included in an H has changed, a new serial execution order M exists such that $j<_M i$ and this M is also equivalent to H in terms of MVSR.

This optimization is implemented through a CPU command called CAS, another CPU command, or a process equivalent to CAS that uses locking. That is, the optimizing unit 132 implements a CAS command. Then, when the optimization has been applied, that is, when the determining unit 131 has determined that a write lock is not to be used, the control processing device 10 returns to the command source that the write has succeeded without actually executing the write process of the transaction, that is, the locking, write-ahead logging (WAL), and data updating. Thus, the control processing device 10 can perform processing at a high speed even if writes conflict.

[Algorithm 1]

Figure 3:
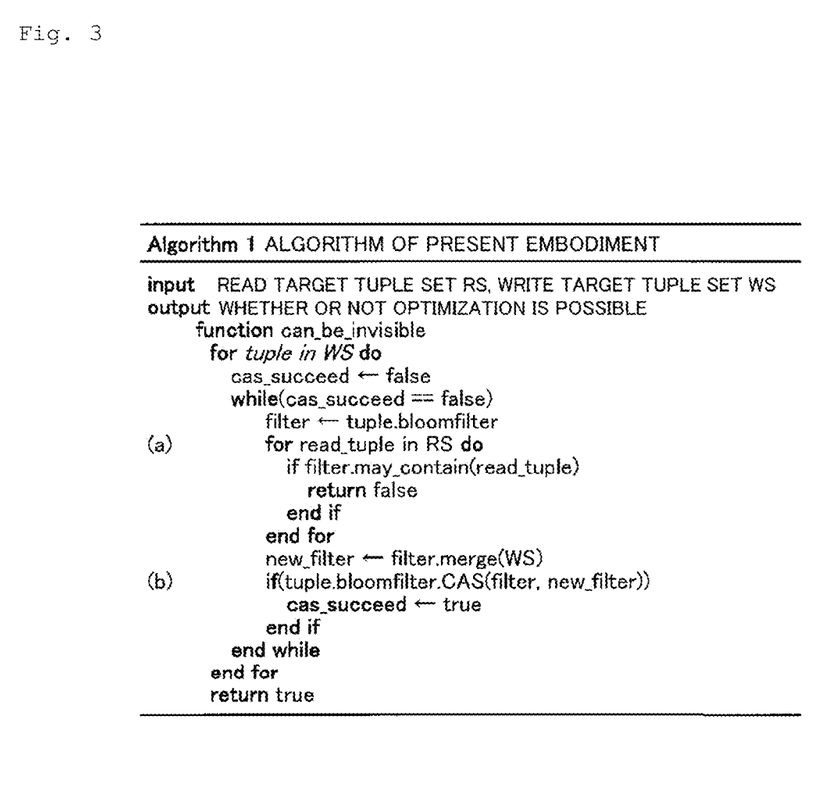
FIG. 3 is a diagram showing an algorithm of processing details executed by a determining unit and an optimizing unit shown in FIG. 1.

The procedures of determination performed by the determining unit 131 of the control processing device 10 and execution of a CAS command executed by the optimizing unit 132 will be described. FIG. 3 is a diagram showing an algorithm of processing details executed by the determining unit 131 and the optimizing unit 132 shown in FIG. 1.

First, in the single-version concurrency control, it has been proved based on MVSR that discarding a write process does not affect the isolation if written content of the write process has been overwritten without being read even once because it will never be read in the future (see NPL 1 for details).

In the present embodiment, write processes are actively discarded. In the present embodiment, the determining unit 131 targets an already existing write process "blind write" which does not involve a read process and verifies whether or not a write can be discarded, assuming that the write itself has occurred in M in the past with respect to a transaction that performed the blind write.

When the optimizing unit 132 has performed optimization (discarding of the write command), the order of the transaction $T_j$ and the transaction $T_i$ that performed the blind write in the past in M becomes such that j<i. Here, in (a) in the algorithm in FIG. 3, the determining unit 131 verifies, using the Bloom filter, whether or not a relationship shown in the following expression (3) exists in the command execution order H.

[Formula 3]

$$\{w_i, r_j \text{ such that } w_i < r_j | H\} \quad (3)$$

If a read process corresponding to expression (3) exists in $T_j$, it is required that M have an order of i<j since $T_j$ has read the content of the write process of $T_i$. This order contradicts the order of j<i where the write has been discarded.

That is, if the relationship shown in expression (3) exists, this means that there is no M equivalent to H among N! serial execution orders in terms of both CSR and MVSR and thus isolation of the write command is not guaranteed. Thus, if the verification shown in (a) in the algorithm fails, the write command is not discarded and the determining unit 131 selects single-version control and causes the writing unit 133 to execute the write of the transaction using a write lock, thereby maintaining isolation.

Then, if the relationship shown in expression (3) exists, that is, if the determining unit 131 succeeds in the verification shown in (a) in the algorithm, the optimizing unit 132 discards the write command.

Figure 4:
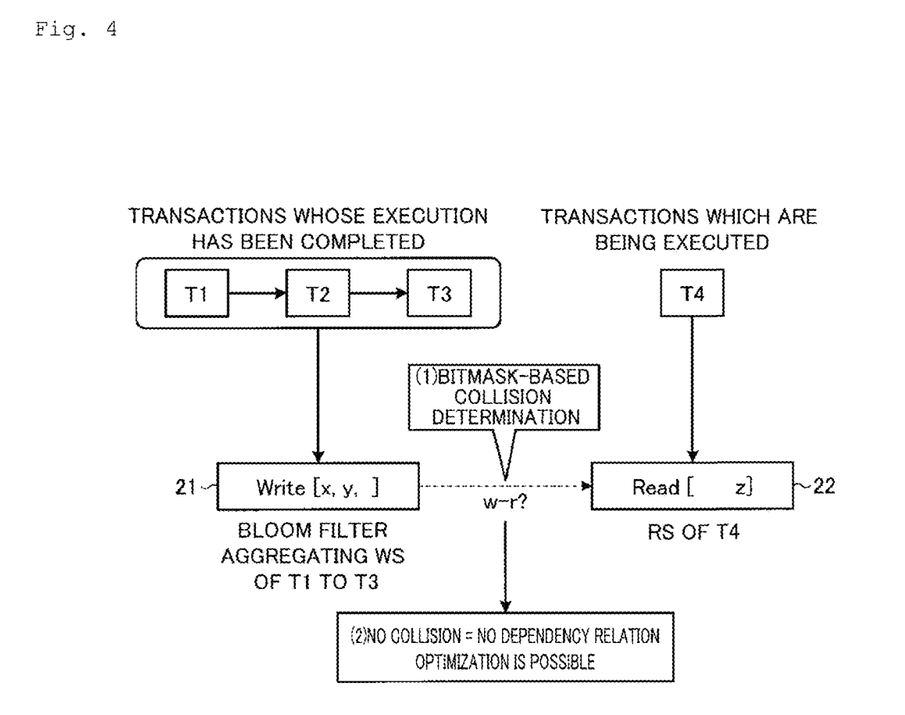
FIG. 4 is a diagram illustrating a determination process performed by the determining unit shown in FIG. 1.

FIG. 4 is a diagram illustrating a determination process performed by the determining unit 131 shown in FIG. 1. For example, FIG. 4 illustrates an example in which the determining unit 131 determines whether or not to optimize a transaction T4 that is being executed. At this time, the determining unit 131 refers to the Bloom filter 121. Then, the determining unit performs bitmask-based determination of collision between the Bloom filter 21, which has aggregated WSs of transactions T1, T2, and T3 whose execution has been completed, and an RS 22 of the transaction T4 (see (1) in FIG. 4).

Upon determining that there is no collision between the Bloom filter 21 and the RS 22, that is, there is no dependency relation between w (the WSs of the transactions T1, T2, and T3) and r (the RS of the transaction T4), the determining unit 131 determines that optimization is possible and causes the optimizing unit 132 to perform optimization (see (2) in FIG. 4).

At this time, the optimizing unit 132 performs a process of sequentially adding the WSs of all transactions that have operated this tuple to the Bloom filter (see (C) in an algorithm of FIG. 6 described later) with CAST commands. The CAS command will be described with reference to FIG. 5.

Figure 5:
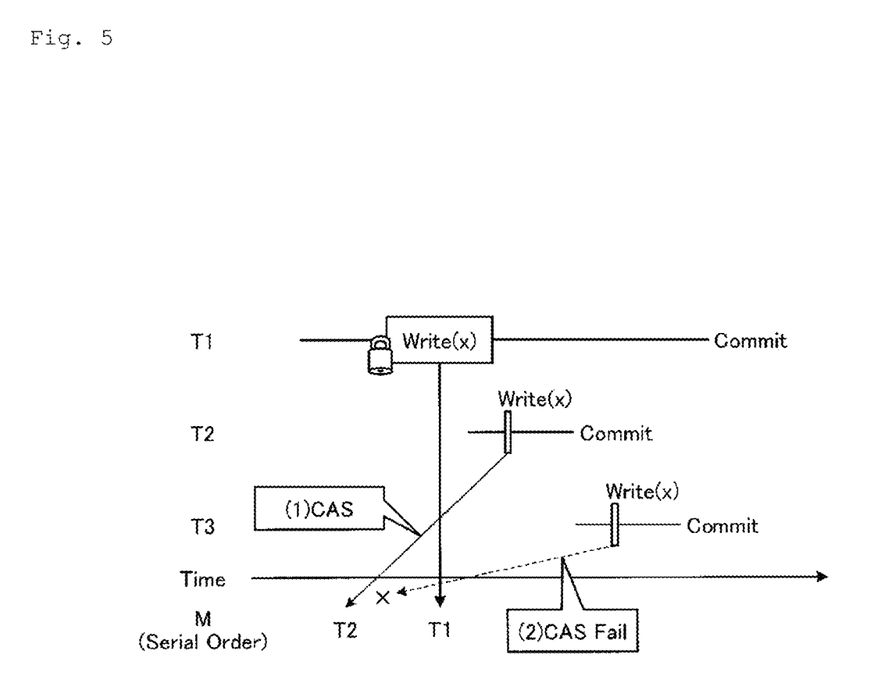
FIG. 5 is a diagram illustrating a compare-and-swap (CAS) command implemented by the optimizing unit shown in FIG. 1.

FIG. 5 is a diagram illustrating a CAS command implemented by the optimizing unit 132 shown in FIG. 1. Even if optimization of a plurality of transactions collides, arbitration is performed because the Bloom filter is kept updated atomically with CAS commands. The case where optimization is performed on a write command of a transaction T2 and a write command of a transaction T3 after a transaction T1 which has acquired a lock and completed a write will be described with reference to FIG. 5.

In this case, the write command of the transaction T2 which has been received previously is discarded because it does not involve a read process and also does not depend on the transaction T1. The optimizing unit 132 executes a CAS command for the transaction T2 (see (1) in FIG. 5).

It can be assumed that the transaction T2 was written before the blind write of the preceding transaction T1 due to the success of the CAS command for the transaction T2 itself. Thus, the optimizing unit 132 can discard the write process of the transaction T2 only with the CAST command. In this example, a CAS command has failed for the transaction T3 (see (2) in FIG. 5), but the optimizing unit 132 reads the Bloom filter 121 again and executes a CAS command again for the transaction T3 received later. As a result, it is possible to determine, for example, that the execution order is equivalent to a serial execution order M ($T_3 \rightarrow T_2 \rightarrow T_1$) where the write of the transaction T3 itself was executed before the blind write of the transaction T2. In this way, the optimizing unit 132 performs arbitration such that writes to the Bloom filter 121 do not conflict.

[Algorithm 2]

Figure 6:
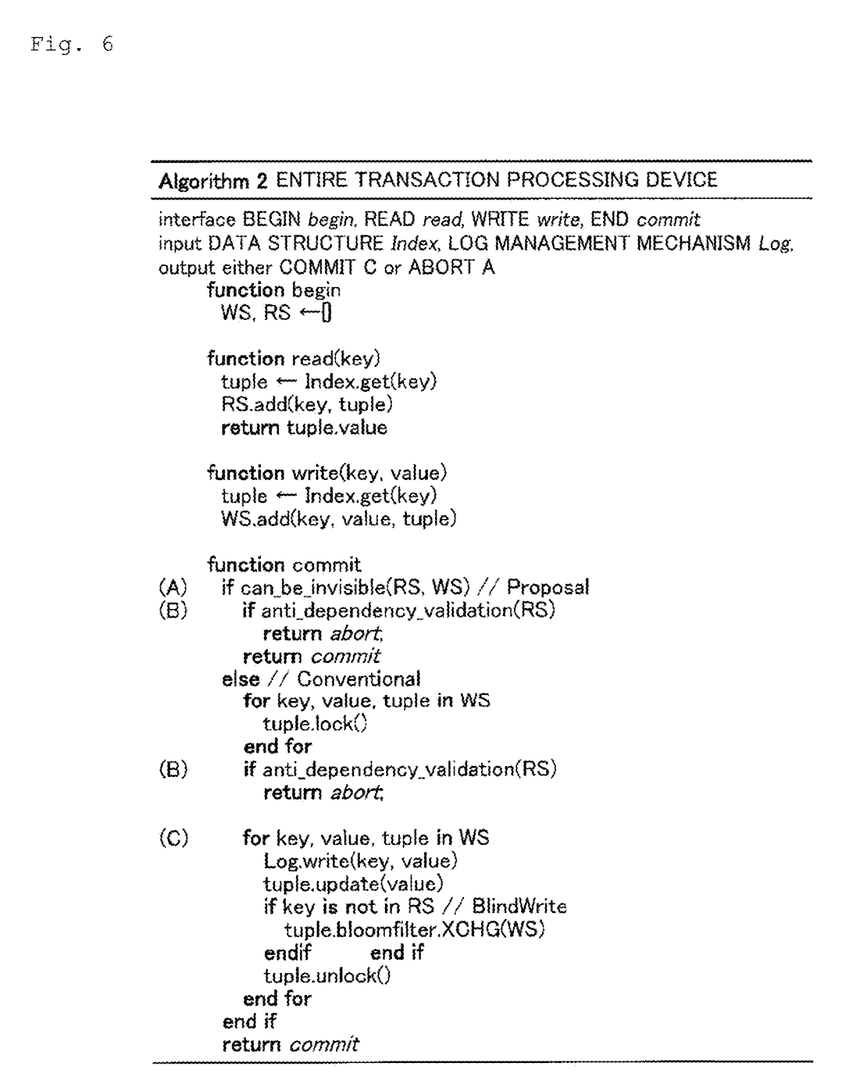
FIG. 6 is a diagram showing an algorithm of the entire processing of the control processing device according to the embodiment.

FIG. 6 is a diagram showing an algorithm of the entire processing of the control processing device 10 according to the embodiment.

The control processing device 10 receives transaction start (Begin), read (Read), write (Write), and transaction end (Commit) as inputs from the user, similar to a general transaction control processing device.

When the present embodiment is applied, there are differences from a general single-version concurrency control algorithm, the differences including (A) and (C) shown in FIG. 6. (A) is determination as to whether or not Algorithm 1 (of FIG. 3) is applicable. If this succeeds, it means that a transaction $T_j$ that is being executed can discard a write to every tuple to be written to. At this time, the optimizing unit 132 records in the Bloom filter 121 that the transaction $T_j$ has been discarded after clearing the Bloom filter 121.

(C) shown in FIG. 6 is a process that the present embodiment adds when optimization of the present embodiment is not applicable, that is, for the processing of the single-version concurrency control algorithm that uses CSR for equivalence. If the writing unit 133 acquired a lock and actually executed a write process but the write process is a blind write, the write process is taken as a target when the present invention is applied to a subsequent transaction. Therefore, the writing unit 133 records a WS of this transaction in the Bloom filter 121 after clearing the Bloom filter 121.

Thus, the control processing device 10 can continuously perform the optimization (write command discarding) using CAS commands through the optimizing unit 132. Furthermore, even if a bit string of the Bloom filter 121 is saturated, the control processing device 10 periodically clears the bit string of the Bloom filter 121 to prevent worsening of false positives.

(B) in FIG. 6 shows a process that is always used in a concurrency control algorithm that uses CSR for equivalence. In the single-version concurrency control, the order of writes and the order of commits are made to match as described above. Thus, there is a possibility that antidependencies do not match although data dependencies and output dependencies (write dependencies) can be unified.

Many techniques have been proposed to efficiently detect isolation violations due to such a possibility. The present embodiment can use any of the prior techniques because the present embodiment is optimization relating to output dependency and the methods of detecting anti-dependency can be combined independently of the present embodiment.

[Processing Procedure of Write Control Process]

Figure 7:
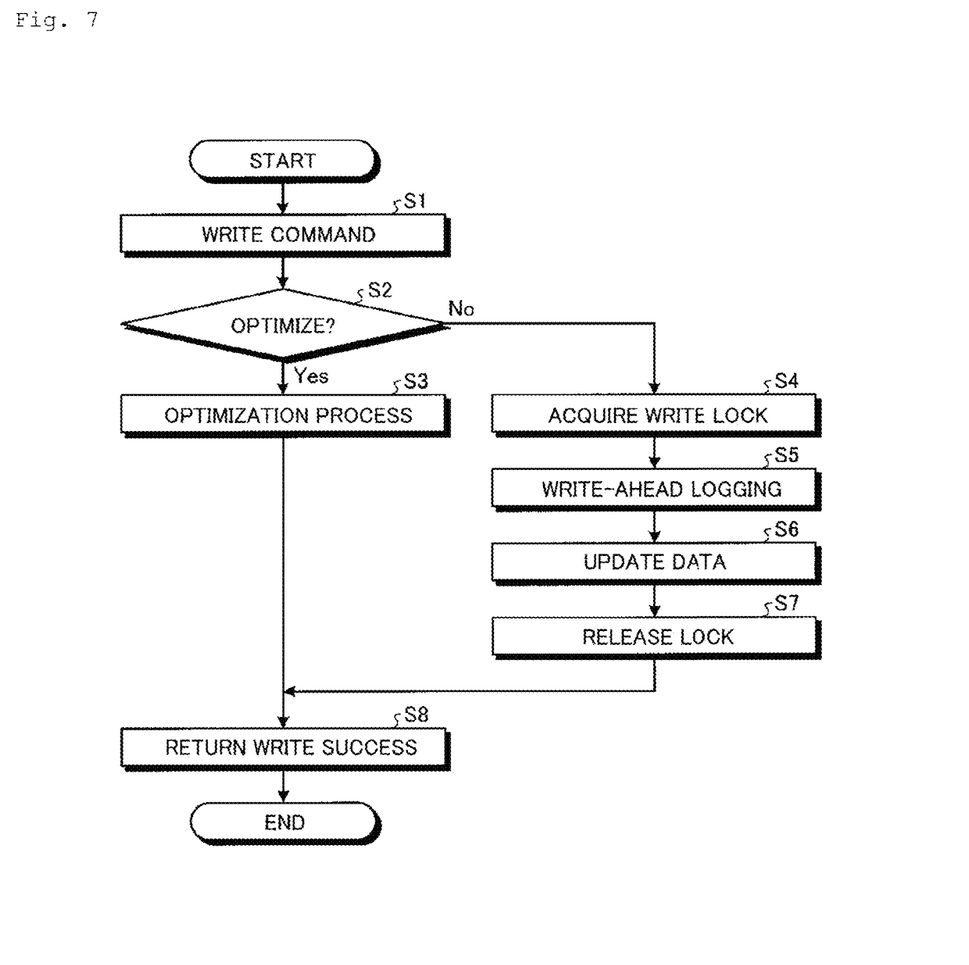
FIG. 7 is a flowchart of a processing procedure of a write control process of the control processing device shown in FIG. 1.

Next, a processing procedure of a transaction write control process of the control processing device 10 will be described. FIG. 7 is a flowchart of a processing procedure of the write control process of the control processing device 10 shown in FIG. 1.

When the control processing device 10 has received a write command of a transaction (step S1), the determining unit 131 determines whether or not optimization is possible as shown in FIG. 7. Specifically, the determining unit 131 determines whether the write of the transaction is to be executed using a write lock or without using a write lock (step S2).

When the determining unit 131 has determined that the write of the transaction is to be executed without using a write lock (step S2: Yes), the optimizing unit 132 performs an optimization process of discarding the write command of the transaction (step S3). On the other hand, when the determining unit 131 has determined that the write of the transaction is to be executed using a write lock (step S2: No), the writing unit 133 executes the write process using a write lock. Specifically, the writing unit 133 acquires a write lock (step S4), performs write-ahead logging (step S5), and updates data (step S6), and then releases the lock (step S7).

After the end of step S3 or step S7, the return unit 134 returns to the command source that the write of the transaction has succeeded (step S8) and ends the processing.

[Effects of Embodiments]

Upon receiving a write command of a transaction, the control processing device 10 according to the embodiment determines whether the write of the transaction is to be executed using a write lock or without using a write lock as described above. Then, upon determining that the write of the transaction is to be executed using a write lock, the control processing device 10 acquires a write lock for the transaction and executes the write of the transaction. Upon determining that the write of the transaction is to be executed without using a write lock, the control processing device 10 discards the write command of the transaction. Then, the control processing device 10 returns to the command source that the write of the transaction has succeeded after the write or after the discarding of the write command.

Thus, according to the control processing device 10, it is possible to significantly reduce time complexity and space complexity and to enable speedup of overall processing because a write command is discarded without executing the actual write upon determining a write lock is not to be used. That is, according to the control processing device 10, it is possible to prevent performance reduction even if writes conflict. In addition, the control processing device 10 acquires a write lock for a transaction and executes a write of the transaction, that is, applies a single-version concurrency control algorithm, upon determining that the write is to be executed using a write lock. Therefore, the control processing device 10 does not impair the high implementation efficiency and processing performance of the single-version concurrency control algorithm.

The bloom filter 121 that can be operated atomically is also added to the control processing device 10. Thereby, for a write command that does not involve reading of its content already recorded in the Bloom filter 121, the determining unit 131 can verify the guarantee of isolation of the write command taken as a target for determination. At this time, the determining unit 131 refers to the Bloom filter 121 and verifies the isolation of the target write command for determination according to the presence or absence of a dependency relation between a plurality of write commands. Then, the optimizing unit 132 discards the write command of the transaction in accordance with an atomic CAS command and records in the Bloom filter 121 that the write command has been discarded.

Thus, in the present embodiment, a write process that does not involve reading, that is, a blind write, is discarded without actually executing the write process if absence of the write process does not affect MVSR, thereby speeding up the overall processing.

The control processing device 10 is also very versatile because it can be implemented simply by adding the Bloom filter 121 to the existing single-version concurrency control algorithm.

As described above, in the control processing device 10, the Bloom filter 121 that can be operated atomically is added to the single-version concurrency control algorithm that uses CSR for equivalence such that it is extended to an algorithm that uses MVSR for equivalence and writes of some transactions are discarded even if write conflicts occur and therefore the processing can be sped up.

[About System Configuration of Embodiment]

The components of the control processing device 10 shown in FIG. 1 are functionally conceptual and are not necessarily physically configured as shown. That is, the specific modes of dispersion and integration of the functions of the control processing device 10 are not limited to those shown and all or some of the devices can be configured such that they are functionally or physically dispersed or integrated in any units according to various loads, use conditions, or the like.

Further, all or any part of the processes performed in the control processing device 10 may be realized by a CPU and a program to be interpreted/performed by the CPU. The processes performed in the control processing device 10 may also be realized as hardware by a wired logic.

All or some of processes described as being performed automatically among the processes described in the embodiments may be performed manually. All or some of processes described as being performed manually may also be performed automatically according to a known method. The processing procedures, the control procedures, the specific names, and information including various data and parameters described above or shown may be appropriately changed except for specified cases.

[Program]

Figure 8:
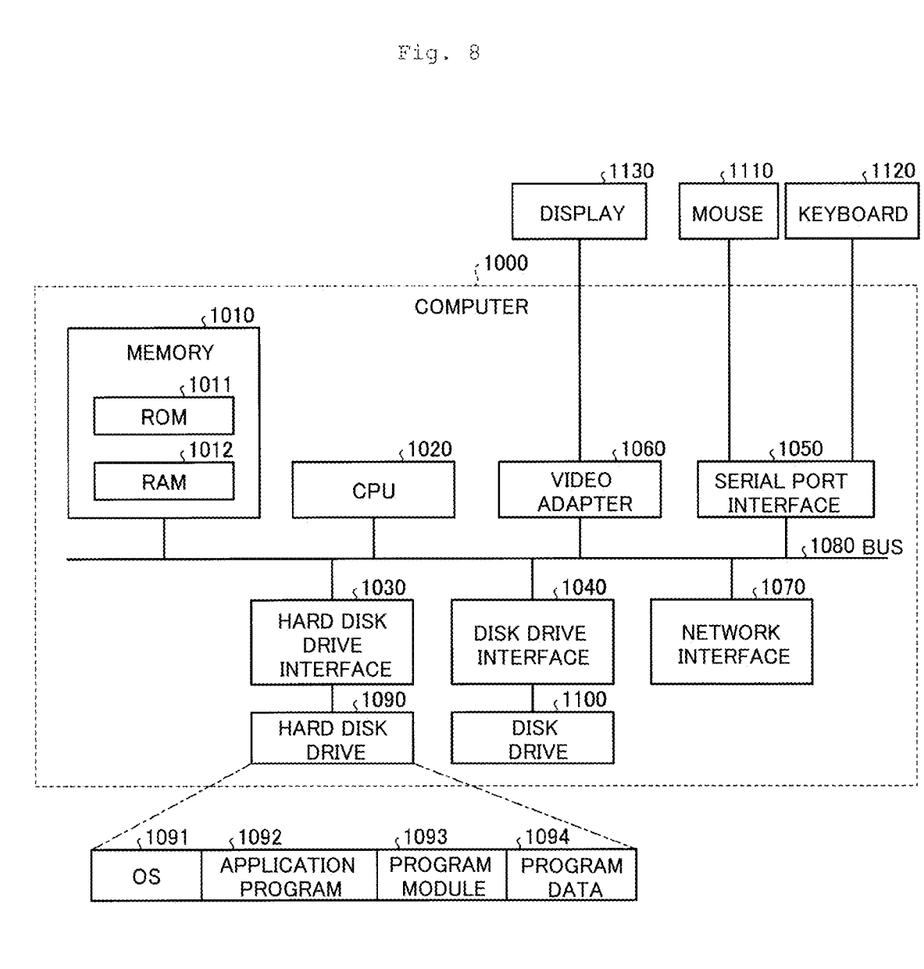
FIG. 8 is a diagram showing an example of a computer that realizes the control processing device by executing a program.

FIG. 8 is a diagram showing an example of a computer that realizes the control processing device 10 by executing a program. The computer 1000 has, for example, a memory 1010 and a CPU 1020. The computer 1000 has a hard disk drive interface 1030, a disk drive interface 1040, a serial port interface 1050, a video adapter 1060, and a network interface 1070. These components are connected by a bus 1080.

The memory 1010 includes a ROM 1011 and a RAM 1012. The ROM 1011 stores, for example, a boot program such as a basic input output system (BIOS). The hard disk drive interface 1030 is connected to a hard disk drive 1090. The disk drive interface 1040 is connected to a disk drive 1100. For example, a removable storage medium such as a magnetic disk or an optical disc is inserted into the disk drive 1100. The serial port interface 1050 is connected, for example, to a mouse 1110 and a keyboard 1120. The video adapter 1060 is connected, for example, to a display 1130.

The hard disk drive 1090 stores, for example, an operating system (OS) 1091, an application program 1092, a program module 1093, and program data 1094. That is, a program that defines each processing of the control processing device 10 is implemented as the program module 1093 in which codes executable by the computer 1000 are described. The program module 1093 is stored, for example, in the hard disk drive 1090. For example, a program module 1093 for executing the same processing as the functional configuration of the control processing device 10 is stored in the hard disk drive 1090. The hard disk drive 1090 may be replaced by a solid state drive (SSD).

Setting data used in the processing of the embodiments described above is stored as the program data 1094, for example, in the memory 1010 or the hard disk drive 1090. The CPU 1020 reads the program module 1093 and the program data 1094 stored in the memory 1010 and the hard disk drive 1090 into the RAM 1012 as needed and executes them.

The program module 1093 and the program data 1094 are not limited to being stored in the hard disk drive 1090. For example, the program module 1093 and the program data 1094 may be stored in a removable storage medium and read by the CPU 1020 via the disk drive 1100 or the like. Alternatively, the program module 1093 and the program data 1094 may be stored in another computer connected via a network (such as a local area network (LAN) or a wide area network (WAN)). Then, the program module 1093 and the program data 1094 may be read from the other computer by the CPU 1020 via the network interface 1070.

Although embodiments to which the invention made by the inventor is applied have been described, the present invention is not limited by the description and the drawings that form a part of the disclosure of the present invention according to the present embodiments. That is, other embodiments, examples, operation techniques, and the like that those skilled in the art implement based on the present embodiments are all included in the scope of the present invention.

REFERENCE SIGNS LIST

10 Control processing device
11 Input unit
12 Storage unit
13 Control unit
14 Output unit
121 Bloom filter
131 Determining unit
132 Optimizing unit
133 Writing unit
134 Return unit

The invention claimed is:

1. A control processing device that controls write processes of transactions, the control processing device comprising:
a processor configured to:
   determine whether a write of a transaction is to be executed using a write lock or without using the write lock upon receiving a write command of the transaction;
   acquire the write lock for the transaction and execute the write of the transaction when the determining has determined that the write of the transaction is to be executed using the write lock;
   discard the write command of the transaction when the determining has determined that the write of the transaction is to be executed without using the write lock; and
   return to a command source that the write of the transaction has succeeded after the write or after the discarding of the write command.

2. The control processing device according to claim 1, further comprising:
   a memory configured to store a log in which information regarding the write of the transaction is recorded atomically,
   wherein the determining is configured to refer to the log, take a write command which does not involve reading of corresponding content already recorded in the log as a target write command for determination, and cause the write of the transaction upon determining that guarantee of isolation of the target write command for determination is not possible.

3. The control processing device according to claim 2, wherein:
   the determining is configured to refer to the log and verify the isolation of the target write command for determination according to presence or absence of a dependency relation between a plurality of write commands, and
   the discarding of the write command discards the write command of the transaction in accordance with an atomic command, acquire a lock of the log, and record in the log that the write command has been discarded.

4. The control processing device according to claim 2, wherein the log is a Bloom filter, and the discarding of the write command utilizes a CAS command.

5. A control processing method executed by a control processing device that controls write processes of transactions, the control processing method comprising:
   a determination step of determining whether a write of a transaction is to be executed using a write lock or without using the write lock upon receiving a write command of the transaction;
   a writing step of acquiring the write lock for the transaction and executing the write of the transaction when it has been determined in the determination step that the write of the transaction is to be executed using the write lock;
   an optimization step of discarding the write command of the transaction when it has been determined in the determination step that the write of the transaction is to be executed without using the write lock; and
   a return step of returning to a command source that the write of the transaction has succeeded after the write in the writing step or after the discarding of the write command in the optimization step.

6. A non-transitory computer readable medium including a control processing program for causing a computer to function as the control processing device according to claim 1.

* * * * *